United States Patent [19]

Bohle

[11] Patent Number: 5,334,244
[45] Date of Patent: Aug. 2, 1994

[54] DEVICE FOR COVERING LUMPY PRODUCTS, ESPECIALLY PILLS, PELLETS OR TABLETS, WITH A COATING MATERIAL

[76] Inventor: Lorenz B. Bohle, Industriestrasse 18, D-4722 Enningerloh, Fed. Rep. of Germany

[21] Appl. No.: 971,345

[22] Filed: Nov. 4, 1992

[30] Foreign Application Priority Data

Nov. 27, 1991 [DE] Fed. Rep. of Germany ....... 4138997

[51] Int. Cl.⁵ .......................... A23G 3/26; B05C 3/00
[52] U.S. Cl. ....................................... 118/19; 118/20; 118/418; 34/130
[58] Field of Search ............. 118/418, 19, 20; 34/130, 134, 138

[56] References Cited

U.S. PATENT DOCUMENTS

| | | | |
|---|---|---|---|
| 3,716,470 | 2/1973 | Noonan | 118/418 X |
| 3,767,554 | 10/1973 | Noonan | 118/418 X |
| 3,874,092 | 4/1975 | Huttlin | 118/418 X |
| 4,014,774 | 3/1977 | Noonan | 118/418 X |
| 4,287,672 | 9/1981 | Henig | 118/418 X |
| 4,676,187 | 6/1987 | Grabowski | 118/418 X |

FOREIGN PATENT DOCUMENTS

| | | |
|---|---|---|
| 0056573 | 8/1982 | European Pat. Off. . |
| 0080199 | 6/1983 | European Pat. Off. . |
| 0088317 | 9/1983 | European Pat. Off. . |
| 0198929 | 10/1986 | European Pat. Off. . |
| 2249863 | 4/1974 | Fed. Rep. of Germany . |
| 2315882 | 10/1974 | Fed. Rep. of Germany . |
| 2805801 | 8/1979 | Fed. Rep. of Germany . |
| 3032906 | 4/1981 | Fed. Rep. of Germany . |
| 3336076 | 4/1984 | Fed. Rep. of Germany . |
| 4005208 | 9/1991 | Fed. Rep. of Germany . |
| 2053554 | 4/1971 | France . |
| 2133243 | 11/1972 | France . |
| 2222957 | 10/1974 | France . |

OTHER PUBLICATIONS

"Zur pharmazeutischen Technologie der Filmdragierung" Die Pharmazie; H. Kala et al; vol. 34 (1979), pp. 755-765.

Primary Examiner—David A. Simmons
Assistant Examiner—J. Sells
Attorney, Agent, or Firm—Parmelee, Bollinger & Bramblett

[57] ABSTRACT

The invention relates to a device for covering lumpy products, especially pills, pellets or tablets, with a coating material, comprising a rotatable drum, a device designed for feeding air into the drum, a device designed for releasing the air from the drum, including at least one releasing air channel provided with at least one air passage opening directed to the interior space of the drum, and further comprising a device designed for spraying the product located in the drum with a coating material. In order to provide a coating device which is easy to operate, especially easy to clean, and the stop periods of which are substantially reduced, the at least one releasing air channel extends along at least one part of the inside wall of the drum and is detachably connected thereto. Thus, the releasing air channels are easy to detach from the drum and may be cleaned outside therefrom.

15 Claims, 2 Drawing Sheets

DEVICE FOR COVERING LUMPY PRODUCTS, ESPECIALLY PILLS, PELLETS OR TABLETS, WITH A COATING MATERIAL

BACKGROUND OF THE INVENTION

The invention relates to a device for covering lumpy products, especially pills, pellets or tablets, with a coating material, comprising a rotatable drum, a device designed for feeding air into the drum, a device designed for releasing the air from the drum, said device including at least one releasing air channel provided with at least one opening for the air directed to the interior space of the drum, and further comprising a device designed for spraying the products in said drum with a coating material.

DESCRIPTION OF THE PRIOR ART

A device as mentioned above is known from German published application 2,249,863. This device comprises a drum provided with air passage openings which are regularly positioned in the circumferential direction thereof. Each of said air passage openings is closed by a valve preloaded in its closing or sealing position. The entry of each air passage opening and each valve to the interior of the drum is covered by a channel provided with a plurality of air passage openings. The known device further comprises a socalled windbox which is connected to a part of the outer wall of the drum. The intake air is blown into the interior of the drum through the windbox and those air passage openings of the drum which are connected to the windbox and through that air channel covering the respective air passage opening. Each valve cap is lifted by the air pressure acting upon said cap. Thereby, the cross section of stream or of flow of the respective air opening is cleared. A releasing air channel is provided close to the longitudinal axis of the drum. The releasing air is removed through said channel.

A careful cleaning of the entire interior of the drum is necessary if lumpy products are to be coated or covered with different coating materials. It is often imperative to dismount the outer casing of the drum to enable a simpler and better cleaning for example of the valve seats and valve caps or the air passage openings in the drum wall and in the air channels.

Such an acting is very time consuming. Thus, operating costs are normally high.

The known machine comprises a device designed for spraying the products which is positioned within the bulk volume of the product. An entrainment of the coating material by the air streaming radially through the bulk volume of the product cannot be avoided under disadvantageous streaming conditions. Any pollution of the releasing air channel and of the releasing air system as a whole is not precluded if the known machine is used. Thus, the cleaning of the machine may also lead to a longer stop period and, hence, to increased costs.

SUMMARY OF THE INVENTION

Accordingly, it is an object of the present invention to provide a device of the above mentioned type which is easy to operate.

It is a further object of the present invention to provide such a coating device the cleaning process of which can easily be accomplished.

It is still another object of the present invention to provide such a coating device the stop periods of which are reduced.

These and other objects are solved by a device which is characterized in that the at least one releasing air channel extends along at least one part of the inside wall of the drum and is detachably connected thereto. As result thereof air passage openings in the drum wall as used in the discussed prior art are completely unnecessary. Hence, the cleaning effort may substantially be reduced.

Each releasing air channel is also detachably connected to the inside wall such that each channel is easily dismountable and removable from the drum for example through the drum opening. The cleaning of the air passage openings of the releasing air channels is easier and more quickly to provide outside the drum than inside thereof. Thus, any pollution of the bulk volume of the subsequent product is substantially avoided. The cleaning efficiency is improved.

It is a further advantage of the invention that the at least one releasing air channel extends nearly along the whole axial length of the inside wall of the drum. A careful feeding and removing of the air to and from the bulk volume of the product is ensured. Even small amounts of product which are positioned near the border region of the drum may be treated by the air without problems arising.

According to an advantageous embodiment of the present invention the at least one releasing air channel comprises several sections being connected to each other and positioned one after the other in lengthwise direction of the drum. The dismounting of the releasing air channel is simplified since such a channel may easily be removed from the interior space of the drum even through a small drum opening. A releasing air channel consisting of several portions moreover simplifies the adaptation of the releasing air channel to the shape of the inside wall of the drum.

According to another embodiment of the present invention the at least one releasing air channel is in form of rib or baffle, especially in a herringbone pattern, for mixing the products. Thus, the releasing air channel on the one hand functions as a means for removing air from the interior space of the drum and on the other hand as a baffle plate for mixing the products such that additional means built in which must also be cleaned when the bulk volume of the product and the coating material is changed are not necessary.

According to the invention a plurality of releasing air channels are located in a uniform manner at the inside wall of the drum. Hence, a uniform air removal from the bulk material of the product and a quick drying of the coated products are ensured.

It is especially advantageous that each releasing air channel has a triangular cross section and that the air passage openings are positioned in one or more of the side walls of the channel leading to the interior space of the drum. The side wall of the at least one releasing air channel leading in rotational sense of the drum preferably forms a greater angle with the inside wall of the drum than the side wall following in the rotational sense. Thus, the air distribution in the bulk volume of the product may be controlled such that a more homogeneous removal of the air is possible by suction. Since the inclination of the side wall leading in the rotational sense of the drum is greater than the inclination of the side wall of the releasing air channel which side wall follows in the rotational sense, a better delivering or releasing efficiency of the channel and a good mixing of the product to be coated is achieved. These effects are enabled since during rotation of the drum the product is lifted in a rolling manner on the inside wall to a higher level and, therefore, also rolling down of the product on a longer path at the inner side of the drum to the bottom dead center of the drum is achieved. Thus, the thickness of the product layer extending in the radial direction of the drum is reduced such that the pressure drop of the air flowing through the product is lower and, therefore, the energy consumption of the machine is reduced.

It is another advantage of the invention that the number and the form of the air passage openings along the at least one releasing air channel is defined such that the entire area of the air passage openings in a definite portion of the channel is nearly proportional to the amount of product located in this portion. By means of this embodiment of the present invention a uniform air stream through the product is achieved since locations with a lower product concentration only comprise some air passage openings while locations with a higher product concentration comprise a greater number of air passage openings.

According to the invention, the releasing air is removed from the releasing air channel if the channel is positioned in the region of the bottom dead center of the drum. Thus, it is ensured that in any case the air moves through the bulk volume of the product and does not only pass the product on its way to the releasing air channel.

According to another embodiment of the present invention the air feeding device inside the drum includes an intake air channel having a first portion extending in parallel to the longitudinal axis of the drum and being connected to at least one second portion bent to the inside wall of the drum nearly half of the length of the drum. The free end of said second portion is formed like a nozzle extending into the bulk volume of the product at least during the coating process.

By these means the operation of the coating device is further improved since any turbulent flowing in the interior space of the drum outside the bulk volume of the product is avoided. Any undesired beginning of the drying process, i.e. any drying of the coating material on its way to the product which is to be coated is avoided. Because of the direct introduction of the air into the bulk volume of the product, the air mixing in the bulk volume of the product is also improved such that the coated product can be dried faster. Thus, the air mixing is further improved since the free end of the second portion of the intake air channel is positioned such that the air is introduced nearly tangentially into the product moving down inwardly in the drum.

According to a still further advantageous embodiment of the present invention the length of the first portion and the length of the second portion of the intake air channel positioned across the longitudinal axis of the drum may be changed by means of telescope guides. Thus, the intake air channel may be used in a plurality of devices with different drum sizes. Moreover, the intake air channel may be adapted to the amount of product such that a direct introduction of the intake air into the bulk volume of the product is ensured even if a small amount of product is to be treated.

According to another embodiment of the present invention the device designed for spraying the products comprises a spray channel the one end of which is mounted on a cover device closing the drum and the other free end of which is bent to the inside wall of the drum half of the length of the drum. The other free end of the spray channel is formed like a nozzle and positioned above the bulk volume of the product and directed thereto. Therefore, the spray channel may be removed simultaneously with the cover device from the drum. The stop period of the device is thereby reduced. It is further advantageous that the one end of the spray channel is mounted on the cover device by means of a telescope guide so that the length of the spray channel may also be adapted to the length of the respective drum. The same spray channel may be used for drums of different sizes.

It is further advantageous that the intake air channel and the releasing air channel are connected to the one end of the drum and that the spray channel is connected to the opposing other end of the drum which may be closed by the cover device. Thus, the connections for the intake air and the releasing air may be positioned close to each other so that the entire device for feeding and removing the air requires only a small space. Since the device for feeding and removing the air and the device for spraying the products are positioned at different drum ends any mutual impediments are substantially avoided which may otherwise occur if adjustment or maintenance work is to be done with respect to both devices.

DESCRIPTION OF THE DRAWINGS

A better understanding of the invention will be reached by reference to the following detailed description when read in conjunction with the accompanying drawings in which.

DETAILED DESCRIPTION OF THE PREFERRED EMBODIMENT OF THE INVENTION

Figure 1:
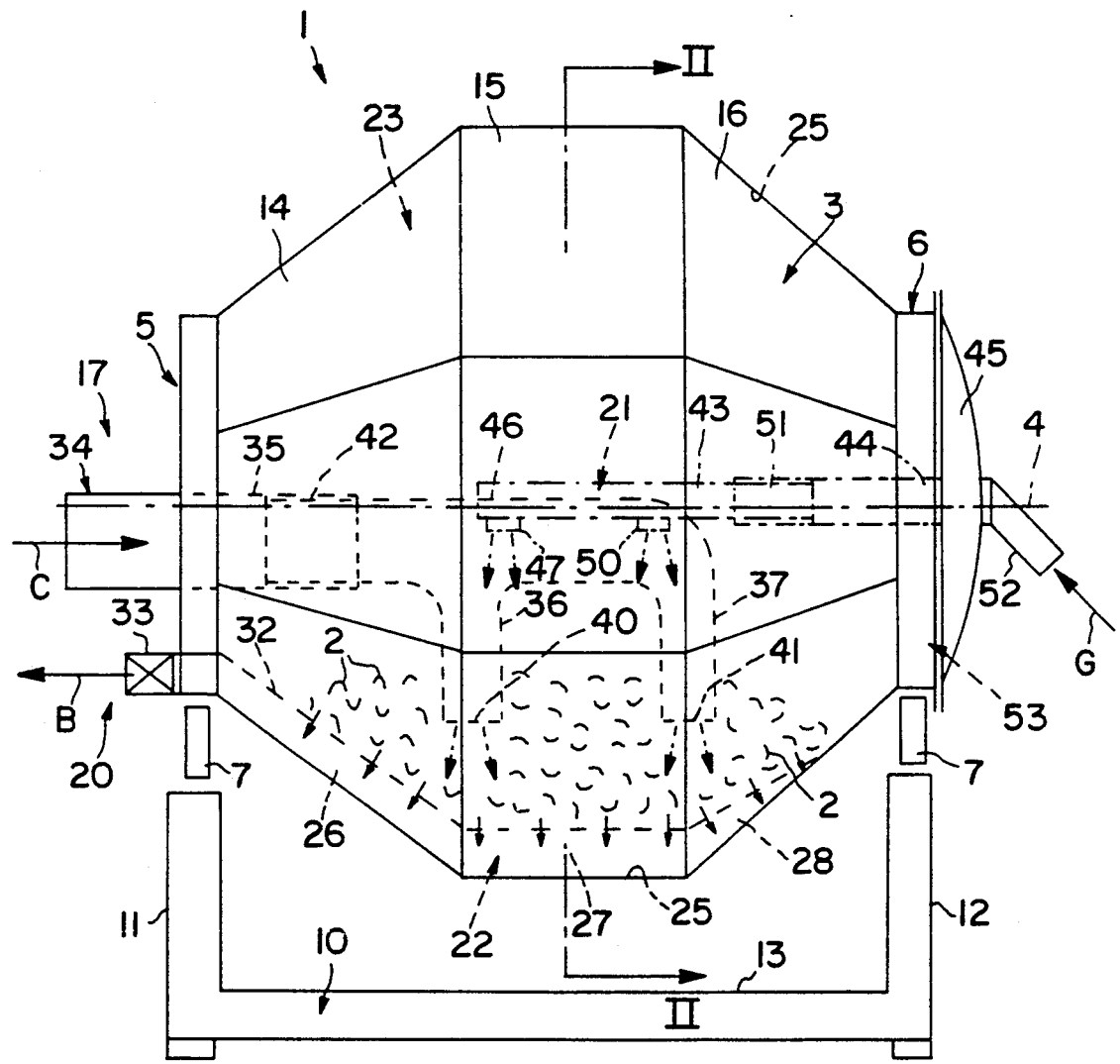
FIG. 1 is a schematic side view of a device designed for coating lumpy products in a rotatable drum.

A device 1 for covering lumpy products 2 with a coating material is shown in FIG. 1 in a schematical side view. The device may preferably be used for coating of lumpy products, i.e. of products in the form of granulates or particles of the pharmaceutical industry, for example tablets and pills, or of products from the foodstuff industry, for example bonbons.

According to FIG. 1 the coating device 1 comprises a rotatable drum 3 having a horizontal longitudinal axis 4. At its one end 5 and at its other end 6 the drum 3 is rotatably mounted on rolls 7 which form one part of a holding device 10 for the drum. The holding device 10 comprises two vertical holding frames 11, 12 located one apart the other. Preferably several rolls 7 are rotatably mounted on the upper sides of the holding frames. The undersides thereof are mounted on a not shown floor and are connected to each other by at least one support 13.

The coating device further comprises a not shown driving unit provided to rotate the drum. This unit may directly act on the drum through one of the rolls 7, or may indirectly act on the drum 3 by means of a driving belt.

According to FIG. 1 the drum 3 has a first truncated portion 14 directly connected to the one end 5, a polygonal middle portion 15 connected thereto and a second truncated portion 16 connected to the middle portion and to the other end 6 of the drum. Instead of the prescribed polygonal cross section the drum may have a circular cross section.

The coating machine 1 further comprises a device 17 designed for feeding air into the drum 3, a device 20 designed for removing air from the drum and a device 21 designed for spraying the products provided in the drum with a coating material. The devices 17 and 20 designed for feeding or removing air are partially shown in broken lines while the device 21 designed for spraying the products is shown in dash-dot lines.

Figure 3:
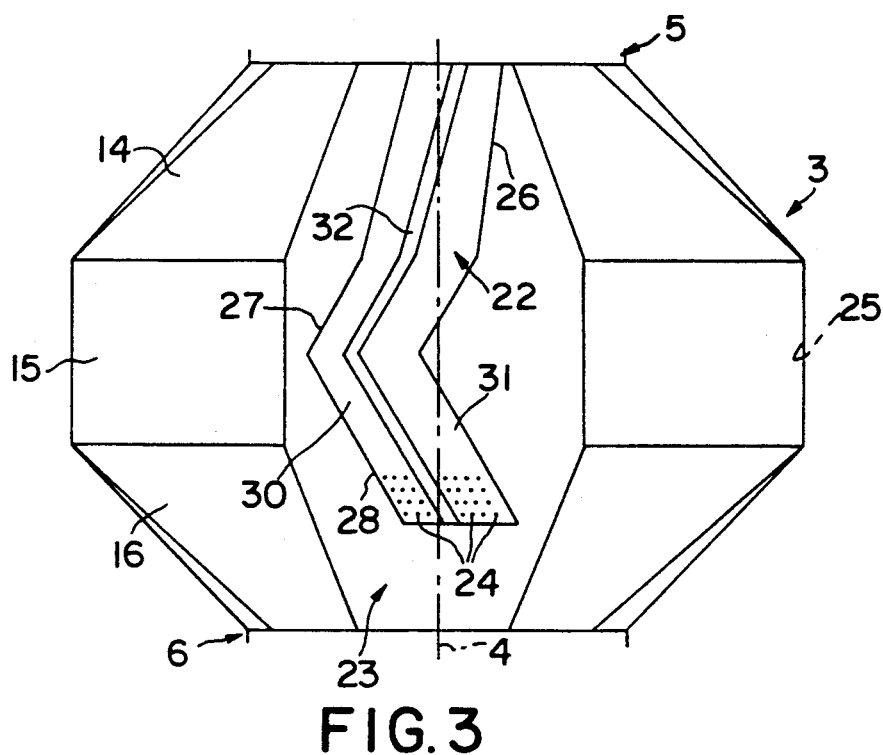
FIG. 3 is a schematic partial top view of the device according to FIG. 1 wherein a part of the surface area of the drum has been omitted.

According to the present invention the device 20 designed for removing air from the drum 3 is constructed in a special manner. The device 20 comprises several releasing air channels 22 from which FIG. 1 only indicates the channel positioned at the bottom dead center of the drum. Each releasing air channel 22 includes a plurality of air passage openings 24 leading to the interior space 23 of the drum 3. In FIG. 3 some air passage openings 24 are indicated at the free end of the releasing air channel 22. The air passage openings 24 are normally distributed along the entire length and the entire width of the releasing air channel 22.

Each releasing air channel 22 extends along at least one portion of the inside wall 25 of the drum 3. According to FIG. 1 the length of the releasing air channel 22 nearly corresponds to the entire length of the inside wall 25. According to FIGS. 1 and 3 no releasing air channel is provided at the section of the second truncated portion 16 leading to the other end 6 of the drum, since there is normally no product in this region. It is, however, possible to form the length of the releasing air channel according to the length of the inside wall 25.

It is apparent that the air passage openings 24 may comprise many different cross sections. They may be formed of circular, triangular, tetragonal or polygonal, elliptical holes or in the form of an elongated hole. The form of the cross section is preferably determined such that the products to be coated are not in a position to penetrate into the hollow space of the releasing air channels. According to a preferred embodiment of the present invention each releasing air channel 22 comprises several portions 26, 27, 28 connected to each other and positioned one after the other in lengthwise direction of the drum 3. The connection of the respective portions to each other as well as to the inside wall 25 may be constructed in a manifold manner, for example by means of a screwbolt-nut-connection or by snap elements. It is further possible to interlock the portions 26, 27, 28 to each other. Such connections may quickly be detached if the releasing air channel is to be cleaned.

According to FIGS. 1 and 3 the releasing air channel 22 is formed as a baffle in the herringbone pattern. Such a releasing air channel is adapted for throughly mixing the products. The shape of the baffle is preferably determined in such a manner that a uniform and intensive mixing of the products to be coated is achieved. The releasing air channels 22 are uniformly distributed in the circumferential direction of the drum 3 along the inside wall 25 thereof (not shown). Each releasing air channel has a tetragonal cross section and the air passage openings are positioned in two side walls 30, 31 of the channel leading to the interior space 23 of the drum. The number of the releasing air channels depends on the size of the drum. About four releasing air channels are provided if the drum has a small size. Eight or more releasing air channels are arranged if the drum has a big size. The cross section of each releasing air channel 22 may be triangular or polygonal. It is further possible to provide the air passage openings only in one of the two side walls 30, 31 or to provide the openings additionally or only in a plate 32 connecting the side walls to each other.

The side wall 30 of the shown releasing air channels 22, said wall leading in rotational sense (see arrow A in FIG. 2) of the drum 3 forms a larger angle $\alpha$ with the inside wall 25 of the drum forming a part of the releasing air channel than the side wall 31 following in the rotational sense.

The number and the form of the air passage openings 24 are determined along the releasing air channels in such a manner that the entire area of the air passage openings 24 in a determined section of the channel is nearly proportional to the amount of product positioned in said section. Thus, the air passage openings may have a smaller cross section especially in the border regions of the portions 26 and 28 of the drum 3 than in the region of the middle portion 27 to which most of the amount of product is allocated. In order to uniformly remove the releasing air from the bulk volume of the product the area of the air passage openings allocated to each portion of the releasing air channel may increase with the distance of the respective portion from a releasing air flange 33. Thus, the pressure drop resulting from a flowing through each portion 26, 27, 28 of the releasing air channel 22 is nearly the same in each portion.

FIG. 1 shows that the releasing or outlet air is removed from the releasing air channel 22 in the direction of arrow B, if this channel is positioned in the region of the bottom dead center of the drum 3. In this position the part of portion 26 of the releasing air channel 22 which is connected to the one end 5 of the drum 3 is aerodynamically connected to the releasing air flange 33. The releasing air flange 33 may extend over a circumferential part of the end 5 of the drum such that the releasing air channel 22 is connected to the releasing air flange 33 for a longer time and moves along a graduated circle around the longitudinal axis 4.

Figure 2:
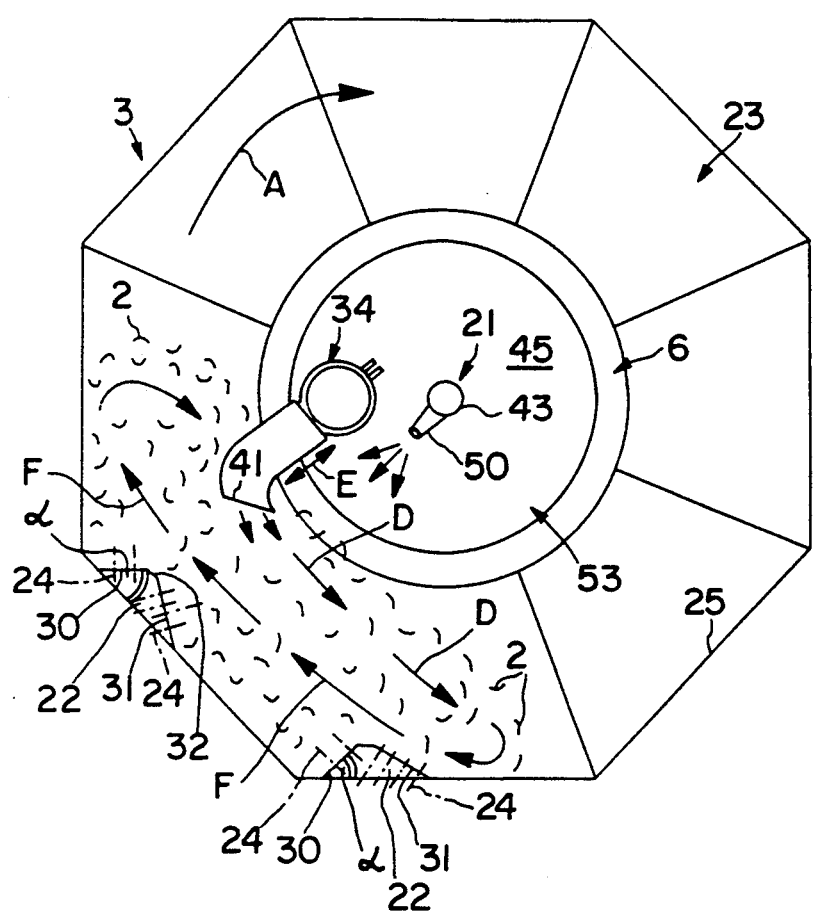
FIG. 2 is a schematic end view of a device designed for coating lumpy products in a rotatable drum.

According to FIGS. 1 and 2 the device 17 designed for feeding the air into the drum 3 comprises an intake air channel 34 into which the intake air is blown by means of a not shown blower in direction of arrow C. The intake air channel 34 has a first section 35 extending parallel to the longitudinal axis 4 of the drum. According to FIG. 1 two second sections 36, 37 are connected thereto and bent to the inside wall 25 approximately half of the length of the drum. The free ends 40, 41 of said second sections 36, 37 are formed as a nozzle (not shown in detail). According to FIGS. 1 and 2 the length of each second section 36, 37 is determined in such a manner that the free ends 40, 41 of the intake air channel 34 are introduced into the bulk volume of the product at least during coating of the product 2. FIG. 2 further shows that the free end 41 of the second section 37 is positioned such that the air is nearly tangentially introduced into the product (see arrow D) moving down inwardly in the drum. Hence, the free end 41 is constructed in the same manner.

The same is preferably true also for the free end 40 of the second section 36. It is, however, also possible to provide only one second section or more than two sections for feeding the air into the product.

In order to adapt the dimensions of the intake air channel to the size of the drum and to the amount of product to be coated the length of the first section 35 can be adjusted by means of a telescope guide 42. The length of the second sections 36 and 37 extending across the longitudinal axis 4 of the drum can also be adjusted in the same manner (in FIG. 2 indicated by double-arrow E).

According to FIG. 1 the device 21 designed for spraying the product comprises a spray channel 43, one end 44 of which is mounted on a cap-like covering device 45 closing the drum 3. The other free end 46 of the spray channel 43 is bent to the inside wall 25 of the drum nearly half of the length of the drum 3. This free end 46 is formed like a nozzle (see FIG. 2) and positioned above the bulk volume of the product and directed thereto. According to FIG. 1 the spray channel 43 comprises in addition to the spray place 47 positioned at the free end 46 of the spray channel 43 a further spray place 50 which is located at the spray channel 43 closer to the covering device 45. Spray places 47, 50 are preferably positioned in such a manner that the product 2 can uniformly be sprayed with the coating material.

According to FIG. 1 the spray channel 43 is mounted in the region of its one end 44 on the covering device 45 by means of a telescope guide 51 such that also the length of the device 21 designed for spraying the products may easily be adapted to the size of the drum. It is further possible to change the distance between the spray places 47, 50 and the product 2 by such a guide.

FIG. 1 further indicates that the intake air channel 34 and the releasing air channel 22 are connected to the one end 5 of the drum 3 and that the spray channel 43 is connected to the opposing other end 6 of the drum 3 which may be closed by the covering device 45. Thus, the respective connections to the air system on the one hand and to the spraying device on the other hand are accessible separately from each other.

In the following the operation of the predescribed coating device is explained in more detail.

The product 2 to be coated is filled into the interior space 23 of the drum 3 through the end 6. The length of the intake air channel 34 and of the spray channel 43 is now adjusted to the size of the drum and the amount of product by means of the telescope guide 42, 51. The free end 40, 41 of the intake air channel is aligned in such a manner that it is introduced into the amount of product moving down inwardly in the drum (see arrow D in FIG. 2) at least during coating of the product. For this purpose the second section 36, 37 of the intake air channel 34 may be displaced along the arrows E.

The covering device 45 is mounted on the end 6 of the drum 3 for example by means of screwbolt-nut-connections or snap elements. The intake air channel 34, the releasing air flange 33 of the releasing air channel 22 and a flange 52 for the spray channel 43 are connected to a blower or a store tank for the coating material provided with a delivering apparatus.

The drum 3 is now rotated (see arrow A in FIG. 2) by means of the not shown driving unit. Because of the rotation of the drum the releasing air channels 22 transport the product along the arrows F such that the product first rolls up at the inside wall 25 of the drum and subsequent rolls down along the arrows D at the side positioned radially inwardly. Therefore, the product moves along a closed path.

The coating material is now introduced via the flange 52 through the covering device 45 into the spray channel 43 along arrow G and via the spray places 47, 50 on the product. Afterwards or at the same time warm air is introduced into the product rolling down radially inwardly via the intake air channel 34 through the free ends 40, 41 along the arrow C in FIG. 1. The warm air intensively flows through the bulk volume of the product and thereby dries the coating layer, for example a lacquer layer of a chocolate layer, deposited on the product. The air flows through the air passage openings 24 into the releasing air channel 22 positioned respectively in the region of the bottom dead center of the drum and is removed through the releasing air flange 33 along arrow B.

The ready coated products are removed through the opening provided in the end 6 of the drum after switching off the blower for the air, the driving unit of the drum, the delivering apparatus for the coating material and after detaching of the covering device 45. Subsequent cleaning of the entire interior space 23 of the drum can be accomplished through the drum opening 53 in an easy and quick manner.

The releasing air channels 22 are now detached from the inside wall 25 of the drum preferably section by section and are cleaned outside therefrom. The second sections 36, 37 may also be detached without problem from the first section 35 of the intake air channel 34 via the telescope guide 42 such that these elements can also be cleaned outside the drum. The same is true for the device 21 for spraying the products which is mounted on the inside wall of the covering device 45. The device 21 is already positioned outside the interior space of the drum if the covering device is removed from the drum.

Thus, the operation of a coating device for lumpy products is substantially simplified and the cleaning effort is reduced.

We claim:

1. Device for covering lumpy products, especially pills, pellets or tablets, with a coating material, comprising a rotatable drum, a device designed for feeding air into the drum, a device designed for releasing the air from the drum including at least one releasing air channel provided with at least one air passage opening directed to the interior space of the drum, and further comprising a device designed for spraying the product located in the drum with a coating material, characterized in that the at least one releasing air channel extends along at least one part of the inside wall of the drum and is detachably connected thereto.

2. Device according to claim 1, characterized in that the at least one releasing air channel extends nearly along the entire length of the inside wall of the drum.

3. Device according to claim 1, characterized in that the at least one releasing air channel comprises several sections being connected to each other and positioned one after the other in lengthwise direction of the drum.

4. Device according to claim 1, characterized in that the at least one releasing air channel is formed as a baffle especially in a herringbone pattern, for mixing of the product.

5. Device according to claim 1, characterized in that a plurality of releasing air channels is located in a uniform, even manner at the inside wall of the drum.

6. Device according to claim 1, characterized in that each releasing air channel has an at least triangular cross section and that the air passage openings are positioned in one or more of the side walls of the channel leading to the interior space of the drum.

7. Device according to claim 6, characterized in that the side wall of the at least one releasing air channel leading in the sense of rotation of the drum preferably forms a greater angle with the inside wall of the drum forming one part of the releasing air channel than the side wall following in the sense of rotation.

8. Device according to claim 1, characterized in that the number and the form of the air passage openings along the at least one releasing air channel is defined in such a manner that the entire area of the air passage openings in a definite portion of the channel is nearly proportional to the amount of product located in this portion.

9. Device according to claim 1, characterized in that the releasing air is removed from the releasing air channel if the channel is positioned in the region of the bottom dead center of the drum.

10. Device according to claim 1, characterized in that the device designed for feeding the air into the drum includes an intake air channel having a first portion extending in parallel with the longitudinal axis of the drum and being connected to at least one second portion bent to the inside wall of the drum nearly half of the length of the drum, wherein the free end of said second portion is formed like a nozzle and introduced into the bulk volume of the product at least during the coating process.

11. Device according to claim 10, characterized in that the free end of the second portion of the intake air channel is positioned such that the air is introduced nearly tangentially into the product moving down inwardly in the drum.

12. Device according to claim 10, characterized in that the length of the first portion and the length of the second portion of the intake air channel positioned across the longitudinal axis of the drum are adjustable by means of a telescope guide.

13. Device according to claim 1, characterized in that the device designed for spraying the product comprises a spray channel the one end of which is mounted on a covering device closing the drum and the other free end of which is bent to the inside wall of the drum half of the length of the drum, wherein the other free end is formed like a nozzle and positioned above the bulk volume of the product and directed thereto.

14. Device according to claim 13, characterized in that one end of the spray channel is mounted on the covering device by means of a telescope guide.

15. Device according to claim 1, characterized in that the device designed for feeding the air into the drum and the device designed for releasing the air from the drum are connected to the one end of the drum and that the device designed for spraying the product is connected to the opposing other end of the drum which may be closed by the covering device.

* * * * *